May 5, 1925.

P. O. GIBSON

BALL BEARING WHEEL

Filed May 19, 1924

1,536,337

Inventor
Percy O. Gibson,

By
Attorneys

Patented May 5, 1925.

1,536,337

UNITED STATES PATENT OFFICE.

PERCY O. GIBSON, OF KOKOMO, INDIANA, ASSIGNOR TO KOKOMO STAMPED METAL CO., OF KOKOMO, INDIANA, A CORPORATION OF INDIANA.

BALL-BEARING WHEEL.

Application filed May 19, 1924. Serial No. 714,371.

*To all whom it may concern:*

Be it known that I, PERCY O. GIBSON, a citizen of the United States, residing at Kokomo, in the county of Howard and State of Indiana, have invented certain new and useful Improvements in Ball-Bearing Wheels, of which the following is a specification, reference being had therein to the accompanying drawings.

This invention relates to fabricated wheels and more particularly to wheels of small diameter for use upon roller skates and embodying a ball bearing.

An object of the present invention is to provide a construction wherein the body of the wheel is formed entirely from sheet metal stampings and a very strong and rigid structure is secured at a minimum cost of production, the construction being such that the several parts may be firmly and rigidly interlocked and permanently held, by forming operations.

A further object is to provide a construction wherein a ball bearing may be embodied in the structure during the forming operation and will be permanently held in place with the balls housed within the structure and permanently held against accidental or possible escape.

A further object is to provide a structure wherein all of the sheet metal parts are formed from stampings and the stampings assembled and interlocked by means of a press operation.

It is also an object to provide a wheel of this character and for the purpose described, having certain other new and useful features in its construction and method of assembly, all as hereinafter more fully described.

With the above and other ends in view, the invention consists in the matters hereinafter set forth and more particularly pointed out in the appended claims, reference being had to the accompanying drawing, in which—

Figure 2:
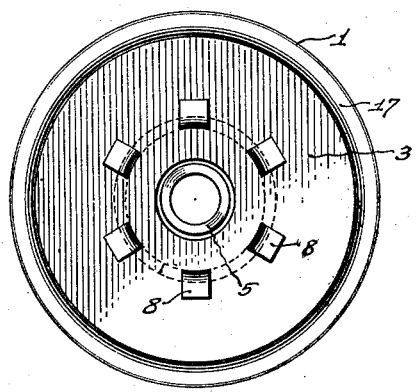
Fig. 2 is a transverse section through Fig. 1.
Figure 1:
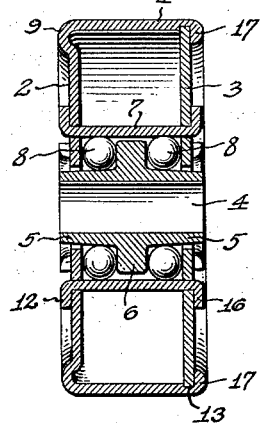
Figure 1 is a side elevation of a completed wheel, illustrative of the invention.
Figure 3:
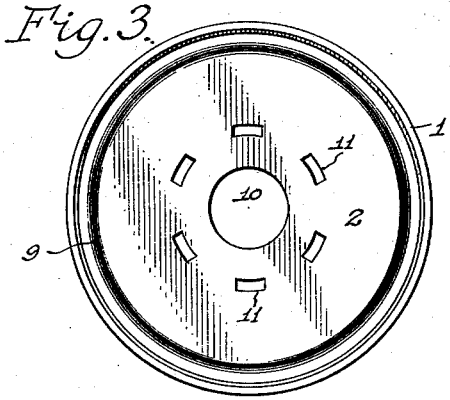
Fig. 3 is a side elevation of the formed and partially assembled wheel body with the axle bearing, ball bearing and its cage removed.
Figure 4:
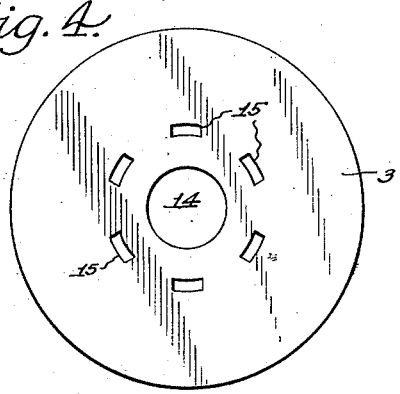
Fig. 4 is a side elevation of a side plate or disk of the wheel body.
Figure 6:
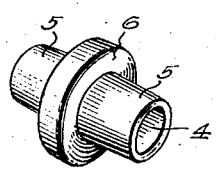
Fig. 6 is a similar detail of a cone bearing for an axle.

In the drawing, 1 represents the rim or tread portion of the wheel, this rim being a part of a sheet metal stamping with one side or disk portion 2 of the wheel formed integral with the rim, said disk forming one of the webs or disks which connect the rim and hub portion of the wheel. The other web or disk is formed from a separate sheet metal stamping in the form of the disk 3, shown in Fig. 4, and the hub or bearing to receive an axle upon which the wheel is to be mounted, is indicated by the numeral 4, as a whole, and is shown in Fig. 6. This hub member 4 is of tubular form with end portions 5 which are tapered exteriorly from a central rib 6 outwardly toward the ends of the hub.

Figure 5:
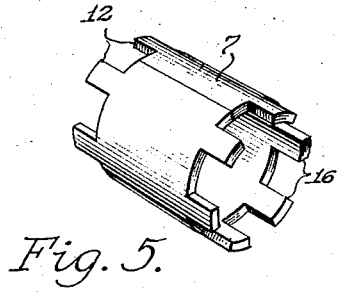
Fig. 5 is a perspective view of a sheet metal drum or ball bearing cage.

A suitable drum or cage, indicated as a whole by the numeral 7 and shown in Fig. 5, is formed of sheet metal with the metal rolled into tubular form and inserted between the disks 2 and 3 to surround the hub 4 in spaced relation thereto to provide a surface for the engagement of two rows of suitable balls 8 interposed between the tapered end surfaces 5 of the hub 4 and the inner surface of the drum 7, with the two rows of balls spaced apart by the rib 6.

In forming up the sheet metal blank which forms the rim 1 and the disk portion 2, the sheet metal is curved, as at 9, to provide a rounded edge portion where the rim and disk meet, and this wall or disk 2 is inset the thickness of the sheet metal. In the wall 2 at intervals around and spaced from the axle opening 10 in said wall through which the end of the hub 4 extends, is a series of openings 11 and the sheet metal cage or barrel 7 is formed with end projections 12 adapted in the assembly of the wheel to be inserted through the openings 11 and the ends of the projections 12 then turned down upon the outer surface of the disk 2 to firmly lock the barrel in place concentrically with the axis of the disk and the said disk.

In the assembly of the wheel, the hub member 4 and the two rows of balls 8 are next inserted within the tubular barrel or cage 7. The disk 3 which forms the side web of the wheel opposite the disk 2 is next assembled by engaging its peripheral edge within an internal groove 13 formed in the rim part 1 near the free edge of this rim. This disk 3 is also formed with an axial opening 14 through which the end of the hub extends and also with a series of openings 15 around the central openings and spaced therefrom, which openings 15 correspond to the openings 11 and are adapted to receive end projections 16 in the end of the barrel 7 opposite the projections 12. These projections 16 after being inserted through the openings 15 are formed down upon the outer face of the disk 3, said disk intermediate said openings being thus forced firmly against the end of the barrel between the lugs or projections 16. The free edge portion 17 of the rim 1 is also formed down upon the outer surface of the peripheral edge portion of the disk 3, the metal being smoothed and rounded into forming operation to provide a smooth, rounded edge to the rim 1. The disk 3 is thus firmly locked in place within the wheel body by means of the downturned lugs 16 which hold it firmly against the end of the drum 7 and is firmly locked to the rim by the inturning of the edge 17 of the rim 1.

The axial openings 10 and 14 in the disks 2 and 3 are of a size to loosely fit the ends of the hub and give ample clearance and extend inwardly from the drum 7 sufficiently to form end walls for retaining the balls 8 in place so that there is no possibility of escape of these balls after the wheel has been assembled. Further the rib 6 on the hub 4, by reason of its engagement between the two rows of balls, precludes the possibility of escape of the hub from the wheel after the wheel has been assembled.

An extremely rigid and durable wheel is thus constructed and one which may be very cheaply manufactured, due to the fact that the body is formed entirely of sheet metal stampings and that these formed stampings are so constructed that they are adapted to be assembled by means of a press and no machine work whatever is required upon any part of the entire structure. Further, there are no fastening means required to secure the parts together, such as bolts or screws, which are liable to become loose and detached and permit the wheel to fall apart.

Due to the construction which is entirely of metal, shrinkage does not effect the wheel, and the ball bearing becomes a permanent part of the wheel which cannot be removed without destroying the wheel and will last indefinitely.

Changes in the construction as shown, may be made within the scope of the appended claims, and such changes are contemplated as not being a departure from the present invention.

Having thus fully described my invention, what I claim is:—

1. A wheel formed of sheet metal stampings with one of said stampings providing a wheel rim and a wheel web extending inwardly from one edge of the rim, a separate member forming one of the stampings and engaged with the rim adjacent the free edge of the rim, a third metal stamping in the form of a cylinder to surround a hub of the wheel and extending across and secured to the web members of the wheel at a distance outwardly from the inner edges of the web members and concentric with the axis of the wheel, a hub member within the cylinder, and anti-friction members interposed between said cylinder and hub member and confined by the portions of the web members extending inwardly of said cylinder adjacent the ends thereof.

2. A wheel formed of sheet metal with a rim and a pair of web members spaced apart at their peripheries by the rim and formed with axial openings and with openings around and spaced outwardly from the axial openings, and a cylindrical member formed with end projections engaging the said openings in the web members and formed down upon the outer surface of said web members to secure the cylindrical member in place between the web members concentric with the axis of the wheel and hold said web members in spaced relation inwardly from the rim.

3. A wheel comprising a rim, web members in spaced-apart relation extending inwardly from the rim, one of said web members being integral with the rim and the other being secured at its periphery to the rim, a cylindrical barrel secured between the web members with its longitudinal axis co-incident with the axis of the wheel, a hub member within the barrel and balls between the hub member and barrel and confined by the inner portions of the web members.

4. A wheel comprising a sheet metal stamping formed to provide a rim for the wheel, and an integral inwardly extending web member, said web member being formed with an axial opening and with a series of openings around the axle opening and spaced therefrom, a separate web member formed with an axial opening and with openings around the axial opening and spaced therefrom, said separate web member being secured adjacent its periphery to the wheel rim, a tubular barrel formed with a series of end projections at each end to engage the series of openings in the web members and adapted to be formed down upon the outer surface of the web member to secure the drum in place between the web members with its longitudinal axis coincident with the wheel axis, a hub member having end portions and an intermediate outstanding rib, said end portions being adapted to extend through the axial openings in the web members, and a series of anti-friction balls at each side of the rib on the hub member and engaging the interior surface of the drum and the exterior surface of the end portions of the hub.

In testimony whereof I affix my signature in presence of two witnesses.

PERCY O. GIBSON.

Witnesses:
 HELEN WALLACE,
 H. J. GALLAGHER.